US012662062B2

(12) United States Patent
Kröner et al.

(10) Patent No.: US 12,662,062 B2
(45) Date of Patent: Jun. 23, 2026

(54) SEAT ASSEMBLY, VEHICLE AND ASSEMBLY METHOD WITH AN ACCESSORY FOR THE CONNECTION OF A FURTHER COMPONENT IN THE VEHICLE INTERIOR

(71) Applicant: BROSE FAHRZEUGTEILE SE & CO. KOMMANDITGESELLSCHAFT, COBURG, Coburg (DE)

(72) Inventors: Gregor Kröner, Bischberg (DE); Sandra Kieser-Neumeyer, Coburg (DE); Tim Oschmann, Friedrichroda (DE); Jörg Gropp, Böhlen (DE)

(73) Assignee: BROSE FAHRZEUGTEILE SE & CO. KOMMANDITGESELLSCHAFT, COBURG, Coburg (DE)

( * ) Notice: Subject to any disclaimer, the term of this patent is extended or adjusted under 35 U.S.C. 154(b) by 313 days.

(21) Appl. No.: 18/688,664

(22) PCT Filed: Aug. 29, 2022

(86) PCT No.: PCT/EP2022/073882
§ 371 (c)(1),
(2) Date: Mar. 1, 2024

(87) PCT Pub. No.: WO2023/031079
PCT Pub. Date: Mar. 9, 2023

(65) Prior Publication Data
US 2024/0294122 A1 Sep. 5, 2024

(30) Foreign Application Priority Data
Sep. 3, 2021 (DE) ..................... 10 2021 209 739.1

(51) Int. Cl.
B60R 11/00 (2006.01)
B60N 2/06 (2006.01)
B60P 7/08 (2006.01)

(52) U.S. Cl.
CPC .............. B60R 11/00 (2013.01); B60N 2/067 (2013.01); B60P 7/0823 (2013.01); B60R 2011/0029 (2013.01); B60R 2011/0084 (2013.01)

(58) Field of Classification Search
CPC ............. B60R 11/00; B60R 2011/0029; B60R 2011/0084; B60N 2/067; B60N 2/773;
(Continued)

(56) References Cited

U.S. PATENT DOCUMENTS

| 6,129,405 A | 10/2000 | Miyahara et al. |
| 2002/0021016 A1 | 2/2002 | Bergquist et al. |

(Continued)

FOREIGN PATENT DOCUMENTS

| DE | 102004046070 A1 | 4/2006 |
| DE | 102010017038 A1 | 2/2011 |

(Continued)

OTHER PUBLICATIONS

ISA European Patent Office, International Search Report Issued in Application No. PCT/EP2022/073882, Dec. 13, 2022, WIPO, 5 pages.

*Primary Examiner* — Hai H Huynh
(74) *Attorney, Agent, or Firm* — McCoy Russell LLP

(57) ABSTRACT

It is provided a seat assembly for a vehicle, comprising at least one vehicle seat and at least one seat rail via which the at least one vehicle seat is adjustably mounted. On the seat rail at least one accessory additionally is adjustably mounted, which provides an interface for the connection with a component independently of the vehicle seat.

20 Claims, 9 Drawing Sheets

(58) Field of Classification Search
CPC .... B60N 2/787; B60N 2/793; B60N 2/01583;
B60N 2/06; B60N 3/063; B60N 3/103;
B60P 7/0823
USPC ...................................................... 296/65.15
See application file for complete search history.

(56) References Cited

U.S. PATENT DOCUMENTS

| | | | |
|---|---|---|---|
| 2020/0231068 A1 | 7/2020 | Gropp et al. | |
| 2021/0206303 A1 | 7/2021 | Petit et al. | |

FOREIGN PATENT DOCUMENTS

| | | | |
|---|---|---|---|
| DE | 102016225053 A1 | 6/2018 | |
| DE | 102019214152 A1 | 1/2021 | |
| DE | 102020134511 A1 | 7/2021 | |
| FR | 2880597 A1 | 7/2006 | |
| JP | 2003080982 A | 3/2003 | |

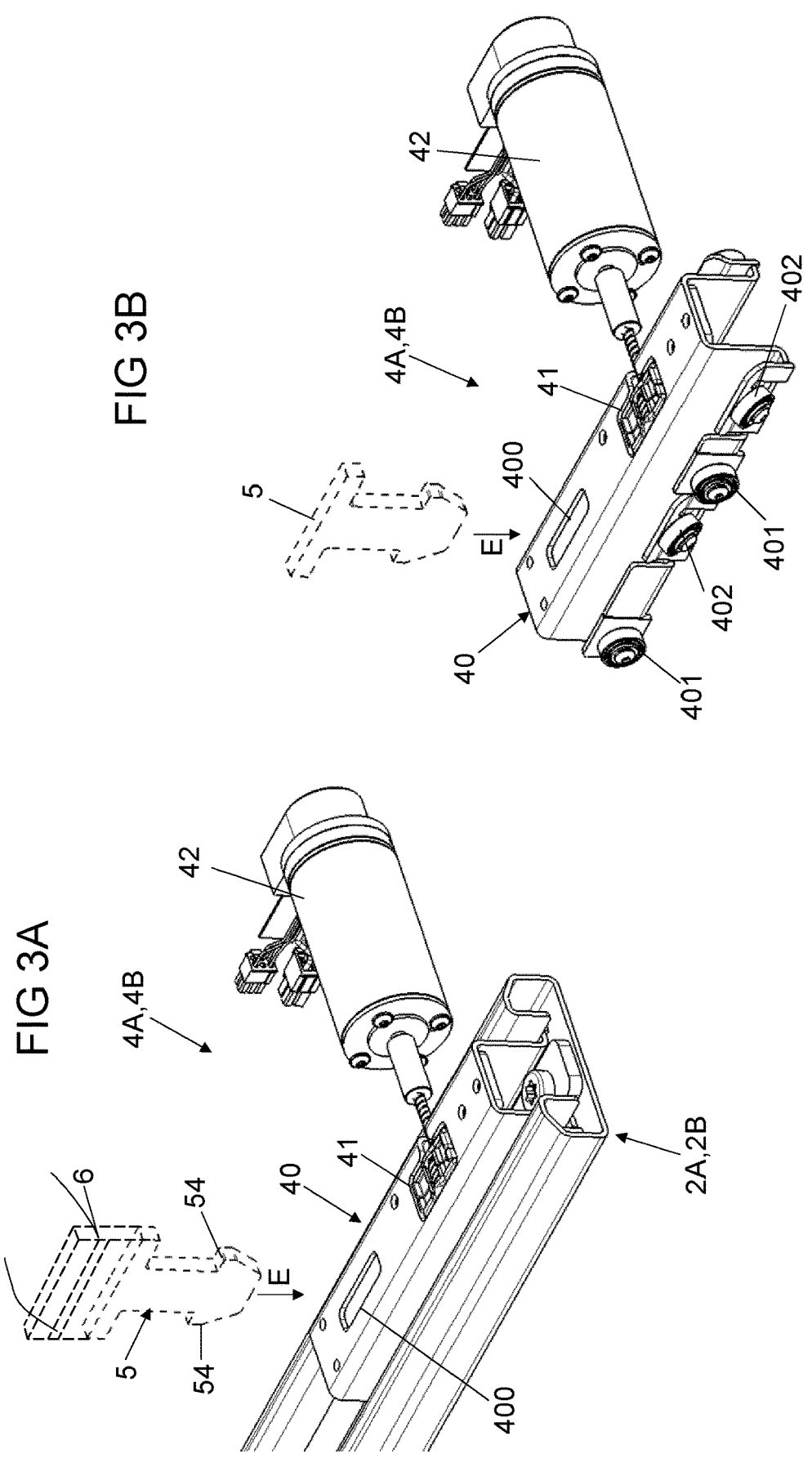

SEAT ASSEMBLY, VEHICLE AND ASSEMBLY METHOD WITH AN ACCESSORY FOR THE CONNECTION OF A FURTHER COMPONENT IN THE VEHICLE INTERIOR

CROSS REFERENCE TO RELATED APPLICATIONS

The present application is a U.S. National Phase of International Application No. PCT/EP2022/073882 entitled "SEAT ASSEMBLY, VEHICLE, AND INSTALLATION METHOD USING ADDITIONAL PART FOR ATTACHING ANOTHER COMPONENT IN THE VEHICLE INTERIOR," and filed on Aug. 29, 2022. International Application No. PCT/EP2022/073882 claims priority to German Patent Application No. 10 2021 209 739.1 filed on Sep. 3, 2021. The entire contents of each of the above-listed applications are hereby incorporated by reference for all purposes.

BACKGROUND

The proposed solution in particular relates to a seat assembly for a vehicle.

Seat assemblies for vehicles with at least one vehicle seat are widely known. The at least one vehicle seat here typically is adjustably mounted on a vehicle floor of the vehicle via at least one seat rail. The vehicle seat can be longitudinally adjusted within an interior space of the vehicle for example manually or in a power-operated way along a longitudinal seat direction and hence along an adjustment axis defined via the at least one rail. To increase comfort for a seat user, seat comfort components frequently are integrated at the vehicle seat, for example with storage possibilities for objects or body parts. Thus, a seat comfort component for example can comprise a storage box, a cup holder or a footrest. Frequently, such seat comfort components are fixed to a seat substructure. In part, however, such seat comfort components are integrated in door panels and/or center consoles.

Furthermore, different load securing systems exist in vehicles, for example in the form of lashing eyelets, load securing belts or straps or cover nets, in order to secure cargo for transport in the interior of the vehicle against unwanted displacement.

So far, the aforementioned components regularly are hardly variable for a vehicle interior for seat comfort and/or for the transport of loaded goods and hence also permit an individual adaptation of the arrangement of individual components by a user of the vehicle, but also for a manufacturer during the assembly, only to a very limited extent. In addition, different components and systems require different possibilities of fixation in the vehicle and hence partly are complex to assemble. Furthermore, the different components frequently are fixed in a vehicle in different way, which renders the use of identical parts more difficult and hence can involve a cost disadvantage.

SUMMARY

The proposed solution aims at providing an improvement for the aforementioned disadvantages.

This object is achieved in particular with a seat assembly with features as described herein, just like with a vehicle with features as described herein and an assembly method with features as described herein.

A proposed seat assembly here provides that on a seat rail for at least one vehicle seat at least one accessory in addition is adjustably mounted, which provides an interface for the connection of a component independently of the vehicle seat.

Thus, the proposed solution here proceeds from the basic idea to provide an additional defined connection possibility for a component on a seat rail for a vehicle seat, which component is not part of the vehicle seat itself and neither is provided for the arrangement of a further vehicle seat on the same seat rail. Thus, the accessory in particular is not provided for carrying a vehicle seat. The at least one accessory additionally adjustably mounted on the seat rail thus can be positioned for example before or behind the vehicle seat and hence axially spaced thereto. A component fixed to the accessory can be usable by a user of the vehicle seat (i.e. in particular by a person sitting on the vehicle seat). However, the only or at least primary fixation of this component is effected via the accessory—in the state of the seat assembly properly mounted in a vehicle—on a vehicle floor of a vehicle and not on the vehicle seat. This in particular includes the fixation of seat comfort components, but also the fixation of components of a load securing system and hence in particular of a load securing part, such as for example a lashing eyelet, a load securing belt or strap, a cover net or a cargo container (e.g. a cargo box or a cooling box).

Since the at least one accessory likewise is adjustably mounted on the seat rail, an additional function is integrated into the seat rail so that the same is not exclusively used for adjustably mounting the vehicle seat. Via the seat rail, the at least one accessory can also be fixable at different distances to the vehicle seat.

In principle, the at least one accessory can be adjustable on the seat rail independently of the vehicle seat and/or jointly with the vehicle seat (i.e. in the latter case in particular in dependence on an adjusting movement of the vehicle seat). In particular, the vehicle seat and/or the accessory can be adjustable manually and/or in a power-operated way, i.e. by using at least one drive motor.

In one design variant, an adjusting element is provided for the adjustment of the vehicle seat on the seat rail, via which an adjusting force can be generated for the adjustment of the vehicle seat along the seat rail. The accessory can then be adapted to likewise cooperate with the adjusting element for an adjustment of the accessory along the seat rail. To consequently adjust the accessory along the seat rail in such a design variant, especially that adjusting element thus is (also) used, which also serves the adjustment of the vehicle seat. The adjusting element here for example can comprise a drive spindle or a toothed rack, which thus is also used by the accessory for an adjustment along the seat rail. For example, both on the side of the vehicle seat and on the side of the accessory there is each provided a drive element cooperating with the drive spindle or the toothed rack. Such a drive element then for example can be a spindle nut meshing with the drive spindle or a gear wheel in engagement with the toothed rack, in order to effect the respective adjustment. In the case of a drive spindle, the drive spindle can be rotatable about its spindle axis in order to jointly adjust the vehicle seat and the accessory along the seat rail. Alternatively, the drive spindle can be stationary and a spindle nut of the accessory can be put into rotation in order to adjust the accessory along the seat rail and possibly also in particular relative to the vehicle seat.

In one design variant, the accessory is adjustable along the seat rail with respect to a longitudinal direction, in particular a longitudinal seat direction, into an adjustment position before or behind the vehicle seat. Thus, via the accessory an interface for the connection of at least one further component to a vehicle floor of a vehicle is provided, which lies before or behind the vehicle seat, when the seat assembly is properly mounted in a vehicle.

Alternatively or additionally, the accessory can be adjustable along the seat rail into an adjustment position in which the accessory above the seat rail is covered by a seat substructure of the vehicle seat and/or by a cover provided behind the vehicle seat (with respect to a longitudinal direction). The accessory can be adjustable for example into a position of non-use or parking position in which the seat substructure and/or an additionally provided cover offer protection against abusive access to the accessory and/or against soiling of the accessory. For example, a cover is formed by a trim arranged below a backrest of the vehicle seat.

As already mentioned above, one design variant provides that the accessory is adjustable along the seat rail in a power-operated way. Thus, the accessory can comfortably be adjusted by a user between different adjustment positions by using a drive motor. To then for example avoid in this connection an unwanted collision of the accessory with the vehicle seat or a connection component adjustably supporting the vehicle seat on the rail, an electronic position detection can be provided. In the case of an electronically controlled setting of an adjustment position it is detected via the electronic position detection at which point along an admissible adjustment path the accessory is located and/or in particular whether the accessory is located at a sufficient distance to the vehicle seat. In an electronically controlled way it can thereby be avoided that during an adjustment, in particular both of the vehicle seat and of the accessory, a collision between accessory and vehicle seat occurs. Via the electronic position detection, a drive motor for the accessory and/or for the vehicle seat can be stopped automatically when the accessory and the vehicle seat have approached to each other up to a minimum distance.

The seat rail in principle can be provided for an assembly below a vehicle floor on the side of the interior space. In particular in the case of a comparatively long seat rail, i.e. a seat rail with a length of more than 1.5 m and in particular with a length of more than 1.8 m, an aesthetically appealing accommodation below a vehicle floor on the side of the interior space is advantageous so as not to have protrude the seat rail from the vehicle floor. A connecting part connected to the seat substructure of the vehicle seat for example merely extends through a floor slot on the vehicle floor in order to shiftably mount the seat substructure on the rail accommodated below the vehicle seat.

To provide a connection possibility more easily accessible for the at least one component in such a configuration via the accessory likewise adjustably mounted on the seat rail, the accessory can comprise at least one trim element that defines at least one part of the interface and is accessible when the seat assembly is properly mounted in a vehicle on the vehicle floor. Then, such a trim element consequently is accessible on an upper side of the vehicle floor, so that a user thereby can easily fix a component.

For a safe arrestment of a component to the accessory, in particular a crash-proof arrestment, a (mechanical and hence positive) locking can be provided at the interface of the accessory for a locking element plugged to the accessory of the component to be connected to the accessory. Consequently, via the interface of the accessory a locking element of the component to be connected (component-side locking element) can be plugged in and be locked at the accessory. Correspondingly, the interface of the accessory is equipped with at least one insertion or locking opening, via which at least part of a component-side locking element can be plugged to the accessory in order to provide for a positive connection with the accessory. For example, in the mounted state of the seat assembly a component can simply be plugged in at a point of the vehicle floor at which the accessory is present.

When the accessory comprises a trim element, an actuating element can be provided at the trim element in order to release the locking with the component-side locking element, if necessary. Thus, upon actuation of the actuating element the component locked at the accessory can be separated from the accessory and then in particular be removed again from a vehicle floor.

For locking a component-side locking element plugged to the accessory, the accessory for example includes a locking mechanism. Such a locking mechanism in particular can be formed with a plurality of pivotally mounted articulated levers for locking the component-side locking element. This for example includes a configuration of the locking mechanism with a four-bar linkage. Via such a four-bar linkage, a hook-shaped end of a locking element for example can be locked with an undercut in a particularly simple and effective way.

For example, the accessory includes a locking mechanism with at least one adjustable blocking portion for locking a component-side locking element, wherein the blocking portion adjusted into a locking position blocks the locking element against removal from the accessory. In the locking position of the blocking portion, the locking element thus is blocked for example against a removal of the locking element from the accessory by an adjustment in a direction opposite to an insertion direction, along which the locking element has been plugged to the accessory. When a locking via the blocking portion present in the locking position is present, a component-side locking element thus cannot be withdrawn again from the accessory, until the blocking portion has been adjusted into an unlocking position and the locking element hence is released again.

To support an automatic locking of a component-side locking element at the accessory, the blocking portion can be pretensioned in the direction of its locking position via at least one spring element. Consequently, when a locking element of a component to be fixed to the accessory is properly plugged to the accessory, the blocking portion automatically gets into its locking position, for example in order to positively lock into place with at least one retaining lug of the locking element (at a hook-shaped end of the locking element), e.g. via an undercut engagement, and to block the locking element against removal from the accessory.

By actuating a possibly provided actuating element accessible at a trim element of the accessory, the blocking portion in one design variant can be adjustable from its locking position into the unlocking position in which locking with a component-side locking element is released. Thus, a user can again easily release a locking at the accessory from outside in order to remove a component from the accessory.

The accessory can be shiftably mounted on the rail for example via a slideway and/or a roller guide. The accessory mounted and traversable on the seat rail here in the manner of an upper rail can be shiftably mounted on a seat rail formed as a lower rail via at least one slideway and/or a roller guide.

In one design variant, the accessory is adapted and provided for connection with a part of a load securing system, e.g. for connection with a lashing eyelet, a load securing belt, a load securing strap, a cover net, a cargo box and/or a cooling box. In particular, such an accessory then for example is formed as a cargo carriage shiftably mounted on the seat rail, in order to be able to secure products to be transported in a vehicle at different adjustment positions specified via the seat rail.

Alternatively or additionally, the accessory is adapted and provided for connection with a seat comfort component that is adapted and provided for being used by a person sitting on the vehicle seat. Such a seat comfort component then for example forms a functional unit that is adapted and provided for deposition of at least one item or at least one body part of the person, in particular in an environment of the vehicle seat within a vehicle interior. For example, such a seat comfort component can be a storage box (in particular with a cup holder integrated thereon), a pocket element (i.e. a functional unit formed with a pocket-shaped storage space) or a footrest. In principle, one and the same accessory can be adapted and provided both for connection with a part of a load securing system and for connection with a seat comfort component. For example, a corresponding locking mechanism therefor is adapted and provided for connection with identically formed locking elements, which are present at parts of the load securing system and a seat comfort component. In particular, an accessory then can also be positioned before or behind a vehicle seat depending on the intended use.

In principle, the seat assembly can comprise at least two vehicle seats and at least two seat rails on each of which an accessory is adjustably mounted. Thus, at least one additional accessory is provided on each seat rail. Hence, the at least two accessories can also be adjustable in pairs, in particular in order to fix exactly one component, in particular exactly one seat comfort component to two accessories of two seat rails. Such a component to be fixed to two accessories for example can be a larger and/or heavier seat comfort component, such as for example a footrest, which is to be fixed to the seat rails of both vehicle seats via the two accessories.

The proposed solution furthermore relates to a vehicle with at least one design variant of a proposed seat assembly. Such a seat assembly in principle can be provided for a first, second or third seat row of a vehicle.

Via an additionally provided rail-side accessory, in particular at least one seat comfort component can be provided in a vehicle interior so as to be exchangeable in a simple way. Such an exchangeability, however, is not necessarily connected with a rail-side support of an accessory.

Correspondingly, an aspect of the proposed solution independent thereof provides a vehicle in which a seat comfort component is fixed via an interface provided on the vehicle floor by an accessory and can be exchanged against another seat comfort component. According to this aspect of the proposed solution, an interface thus is provided within the vehicle on a vehicle floor, via which seat comfort components different from a vehicle seat can be exchanged in a defined way and hence can be fixed in a modular way. An exchange of the seat comfort components here can be performed by a user of the vehicle in order to support a user-specific interior design. An exchangeable fixation of seat comfort components via a defined interface on the vehicle floor can, however, also be advantageous for an easier modification of an interior configuration on the part of the manufacturer or workshop.

For example, different seat comfort components are provided for the vehicle, which can be fixed to the vehicle floor via the one interface provided by the accessory and can be exchanged against each other. What is meant by different seat comfort components here in particular are different types of seat comfort components, which differ for example in terms of their geometry, their dimensions, their respective intended use and/or their respective usage possibilities. For example, a first seat comfort component of a first type correspondingly can comprise a storage box (possibly with at least one cup holder integrated thereon), and a second seat comfort component of a second type can comprise a footrest. Other seat comfort components of course likewise are possible, such as for example a pocket element. With the proposed solution it can now be provided that the one or the other seat comfort component selectively can be fixed and in particular be locked on the vehicle floor via one and the same interface.

In particular, the interface can be formed and adjusted to the usable seat comfort components in such a way that the seat comfort components can be exchanged against each other by a user of the vehicle without any tools. This is possible for example via the definition of a plug connection at the interface provided for the seat comfort components so that a seat comfort component can be plugged to the accessory without any tools. With a locking mechanism provided at the accessory, locking can then take place already by plugging to the accessory so that after plugging to the accessory, the respective seat comfort component is safely fixed to the accessory and hence to the vehicle floor of the vehicle.

Analogously to an accessory according to the first aspect as explained above, an accessory according to the second aspect for seat comfort components to be exchangeably fixed thereto can be designed adjustable relative to the vehicle seat, in particular can be longitudinally shiftably mounted. This in particular includes the mounting of the accessory on a seat rail for the vehicle seat. In one design variant, an interface is defined via the accessory for different seat components, which can be exchangeably arranged before a longitudinally shiftably mounted vehicle seat. Of course, however, positioning an accessory behind a vehicle seat also is easily possible here.

In one design variant, there is provided at least one further, second accessory. By means of the at least one further, second accessory the variability for seat components to be fixed can be further increased. For example, the at least one further, second accessory is arranged relative to the first accessory in such a way that after removal of the one seat comfort component from the first accessory another seat comfort component can be fixed to the vehicle floor by connection both to the first accessory and to the further, second accessory. The at least two accessories hence are matched to seat comfort components and their locking/connecting elements in such a way that via exactly one accessory possibly at least exactly one seat comfort component can be fixed. However, this can also provide at least one further seat comfort component, for which a fixation to at least two accessories is necessary for a fixation to the vehicle floor. For example, a longer seat comfort component can be fixed to at least two (preferably identically formed) accessories so that this longer seat comfort component at least partly extends over at least two adjacent vehicle seats for example along a transverse direction. In a state fixed to the accessories, such a seat comfort component consequently can extend in a region that is associated to at least two vehicle seats arranged one beside the other.

Another aspect of the proposed solution relates to an assembly method for a seat assembly in a vehicle. The vehicle includes a vehicle floor on which at least one vehicle seat of the seat assembly is arranged. The proposed method comprises at least the following steps:

providing an interface for seat comfort components on the vehicle floor by at least one accessory, providing at least two different seat comfort components for the seat assembly, which each are adapted and provided for use by a person sitting on the vehicle seat and each include a (preferably identically formed) locking element for locking the respective seat comfort component at the interface, selecting a seat comfort component from the at least two different seat comfort components, and connecting the selected seat comfort component to the accessory, for example by plugging the respective component-side locking element into the accessory at the interface.

A proposed assembly method thus is suitable in particular for a design variant of a proposed vehicle, in which different seat comfort components can selectively and exchangeably be fixed to a vehicle floor. Correspondingly, in accordance with the proposed assembly method it is analogously provided that by a user of the vehicle, but possibly also by a fitter, a seat comfort component can be fixed to a vehicle floor as required in a fast and easy way.

Here as well, the accessory in principle can also be adjustably mounted on a seat rail on which the at least one vehicle seat also is adjustably mounted. Consequently, a seat rail for the vehicle seat here integrates an additional function due to the mounting of the accessory. For example, in such a design variant the accessory also is shiftably mounted via a slideway and/or roller guide and/or has its own motor drive for a power-operated adjustment.

In accordance with a design variant of the proposed assembly method, the selected seat comfort component can be plugged to the accessory and be locked on the same without any tools. This for example also includes the fact that the selected seat comfort component can be separated from the accessory without any tools for exchange against another seat comfort component. In this way, a user of the vehicle can configure a vehicle interior with different seat comfort components as required, without therefor having to take much effort.

A design variant of a proposed assembly method in particular can be carried out in particular also by using a seat assembly according to the first aspect and/or in a vehicle according to the second aspect. Advantages and features explained above and below for the different aspects thus also always apply for the further aspects of the proposed solution.

BRIEF DESCRIPTION OF THE DRAWINGS

The attached FIGS. by way of example illustrate possible design variants.

FIG. 3A shows an accessory of FIGS. 1 to 2B in an enlarged view together with a drive motor of the accessory and a locking element to be connected to the accessory by way of example;

FIG. 3B shows the accessory of FIG. 3A without representation of the seat rails;

DETAILED DESCRIPTION

FIGS. 1, 2A-2B and 3A-3B show a first design variant of a proposed seat assembly 1 for a design variant of a proposed vehicle. In the present case, the seat assembly 1 is shown with two adjacent vehicle seats 1A, 1B which are longitudinally shiftably mounted on a vehicle floor B in a vehicle interior I via a rail arrangement 2. Via the rail arrangement 2, the vehicle seats 1A and 1B are jointly and/or individually adjustable along a (seat) longitudinal direction L via seat rails 2A, 2B of the rail arrangement 2. Each vehicle seat 1A, 1B includes a seat part 10A or 10B fixed to a seat substructure, relative to which a backrest 11A or 11B is pivotally mounted.

The seat rails 2A and 2B for shiftably mounting the vehicle seats 1A and 1B are arranged below the vehicle floor B. On the vehicle floor B floor slots 20A and 20B are formed, which each extend parallel to the longitudinal direction L and through which a connecting component shiftably mounted on the respectively associated seat rail 2A or 2B protrudes towards the seat substructure of the respective vehicle seat 1A or 1B. In this way, the vehicle seats 1A, 1B can be longitudinally shifted above the vehicle floor B along the seat rails 2A and 2B accommodated below the vehicle floor B.

Between the two longitudinally extending floor slots 20A and 20B, a third floor slot 20C here is also provided centrally. Below this third floor slot 20C, an additional seat rail can be provided (in particular in the case of a shiftability of the vehicle seats 1A, 1B relative to each other). Alternatively or additionally, the additional third floor slot 20C can serve for shiftably guiding an (additional) accessory for the fixation of components different from the vehicle seats 1A, 1B in the vehicle interior I. This will yet be explained in more detail below.

Figure 1:
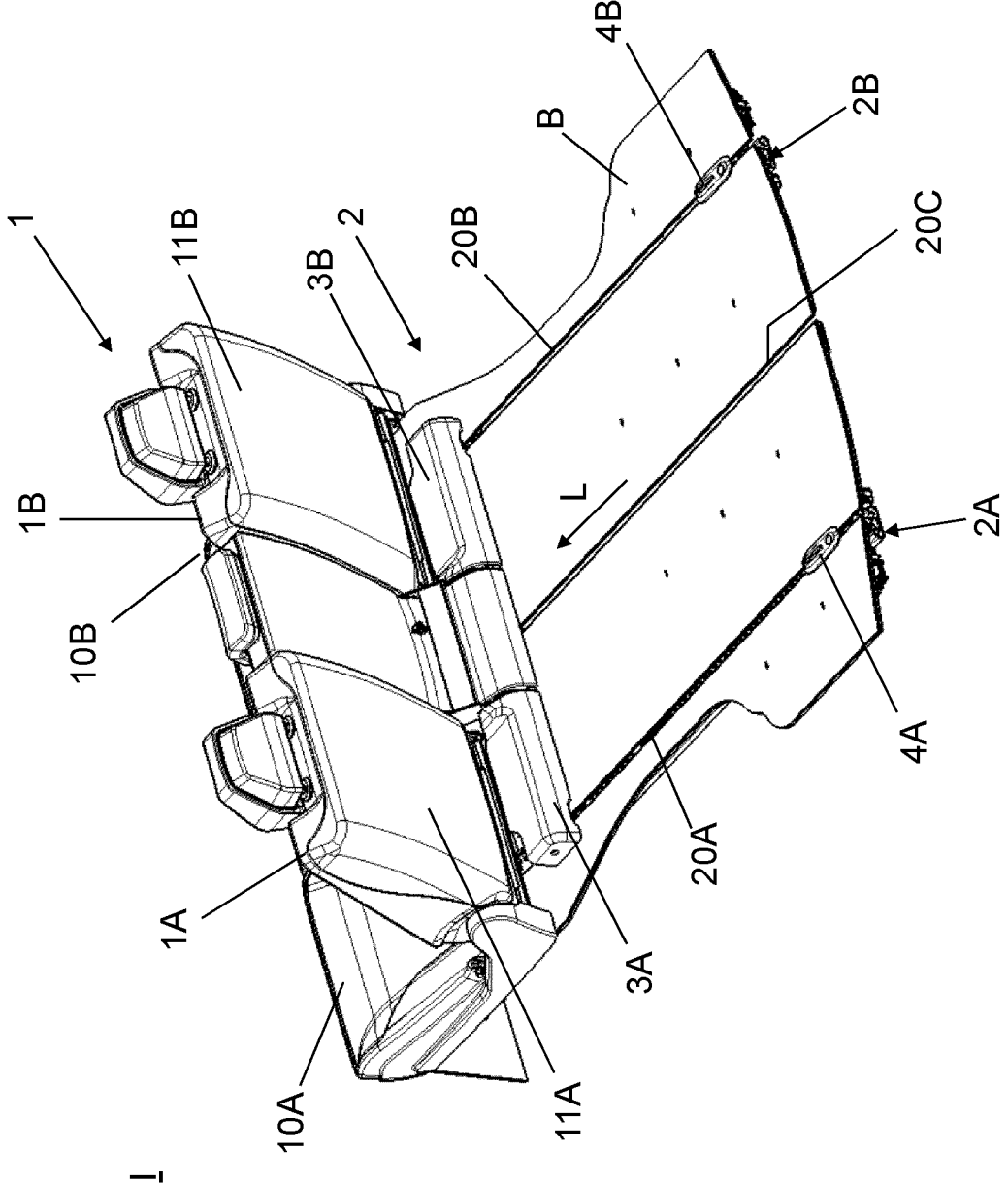
FIG. 1 shows a design variant of a proposed seat assembly with two vehicle seats longitudinally shiftably mounted on a vehicle floor, on whose seat rails provided for the longitudinal displacement an additional accessory each is shiftably mounted, wherein a component different from a vehicle seat can be fixed to the accessories individually or jointly.

In the seat assembly 1 of FIG. 1, the vehicle seats 1A and 1B are adjustably mounted on each rail 2A or 2B in addition via an accessory in the form of a cargo carriage or component carriage 4A, 4B (subsequently briefly: carriage). A seat rail 2A or 2B consequently here also serves the additional guidance of an element different from a vehicle seat 1A or 1B. A carriage 4A, 4B in the present case forms an interface for the fixation of a component different from the vehicle seat 1A or 1B on the vehicle floor B. In the present case, the two illustrated carriages 4A, 4B each are provided behind a vehicle seat 1A or 1B shiftably mounted on the associated seat rails 2A, 2B, with respect to the longitudinal direction L. Via a carriage 4A, 4B for example a part of a load securing system, such as for example a lashing eyelet, a load securing belt or a load securing strap or a cargo container (such as e.g. a cargo box or a cooling box) can be flexibly fixed behind a vehicle seat 1A or 1B. An adjustment position of a carriage 4A, 4B in the present case can be set freely along the respective seat rails 2A or 2B.

Figure 2B:
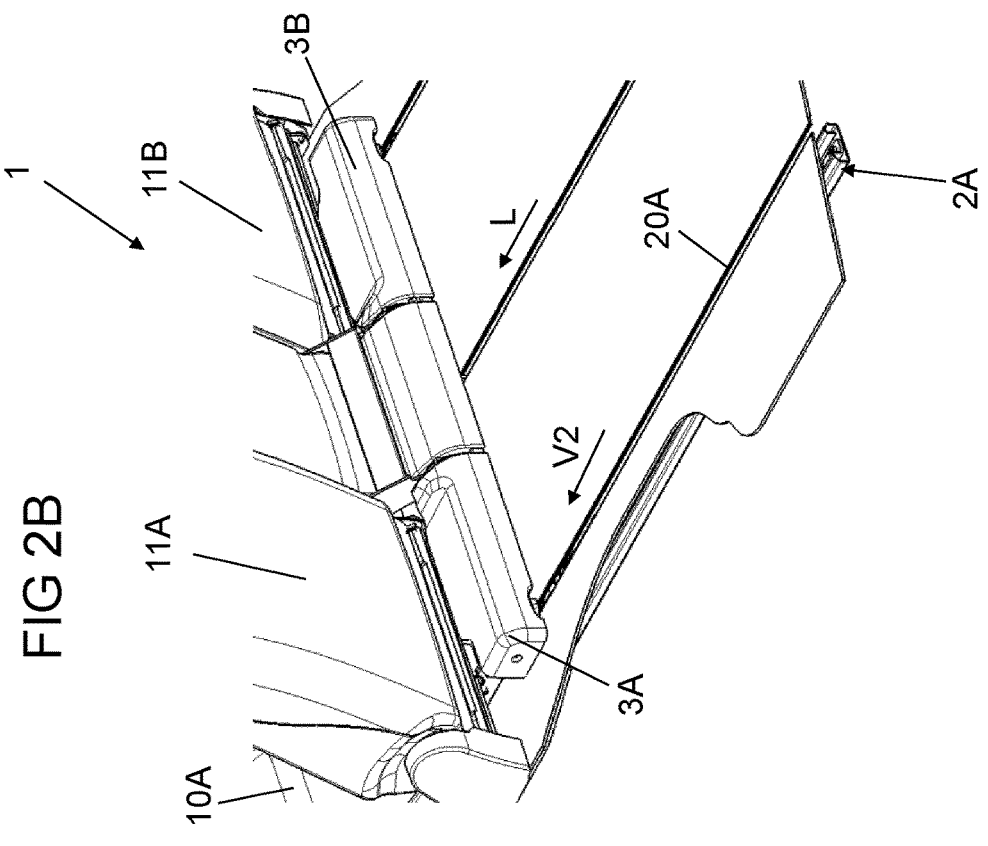
FIGS. 2A-2B in enlarged views each show a section of the seat assembly of FIG. 1 with the accessories in an adjustment position maximally spaced from an associated vehicle seat (FIG. 2A) and in a parking position, in which the respective accessory is protectively accommodated below a cover behind the associated vehicle seat (FIG. 2B)
Figure 2A:
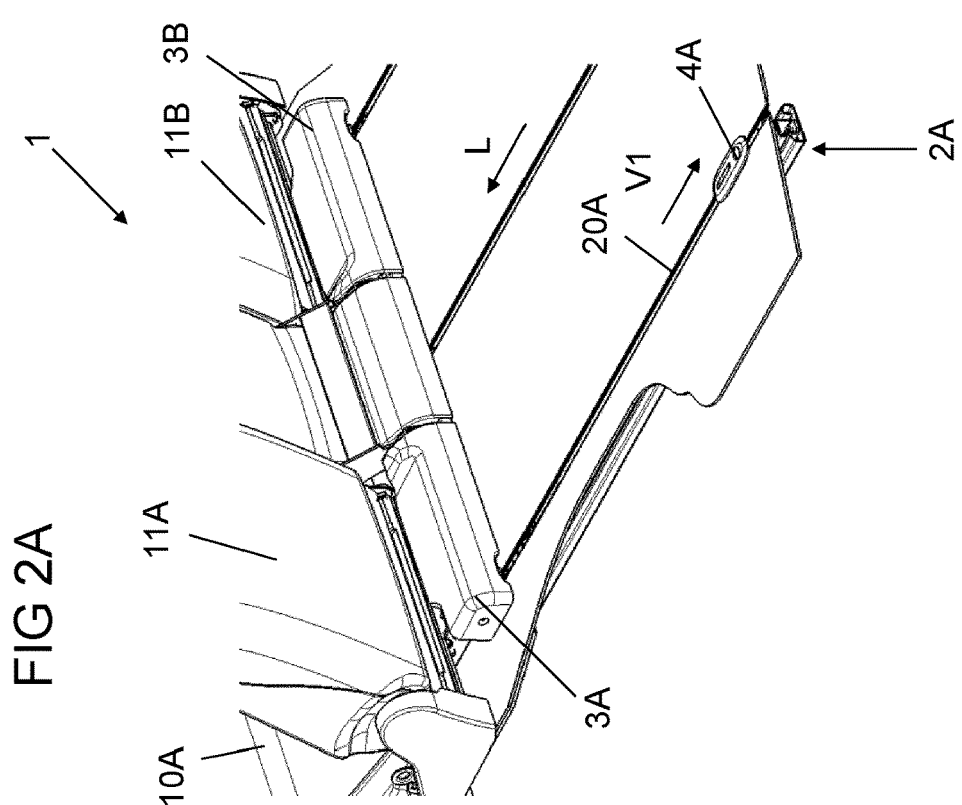

As is illustrated in detail with reference to the enlarged representation of FIGS. 2A and 2B, each carriage 4A, 4B on the respective seat rail 2A or 2B in the present case can be spaced apart as desired along its seat rails 2A or 2B from the respectively associated vehicle seat 1A or 1B along a first adjustment direction V1. If the respective carriage 4A, 4B is not needed, the carriage 4A, 4B can be adjusted in an opposite adjustment direction V2 towards the respective vehicle seat 1A or 1B into a parking position as shown in FIG. 2B. In this parking position, the respective carriage 4A, 4B is protectively accommodated below a cover 3A or 3B—here formed in the manner of a trim—, which is arranged at a rear end of a vehicle seat 1A, 1B so as to cover a part of the vehicle floor B.

In principle, a carriage 4A, 4B can be longitudinally shiftably mounted on a seat rail 2A, 2B via a slideway and/or roller guide. In the present case, each seat rail 2A, 2B by way of example is designed in the manner of a lower rail on which a base part 40 of a respective carriage 4A, 4B, which in its profile is similar to an upper rail, is shiftably guided. On the base part 40 a plurality of differently oriented guide rollers 401, 402 are rotatably mounted (cf. in particular FIGS. 3A and 3B). The base part 40 and hence the respective carriage 4A, 4B thereby is shiftably guided within the seat rail 2A or 2B and moreover also supported on the seat rails 2A, 2B with forces acting on the outside of the base part 40.

The respective carriage 4A, 4B in principle can be provided for a manual adjustment along the respective seat rails 2A or 2B. As is illustrated in more detail with reference to FIGS. 3A and 3B, a carriage 4A, 4B in the illustrated design variant each is adjustable in a power-operated way by means of a drive motor 42. By way of example, the drive motor 42 is configured as an electric motor that is coupled with a transmission. For the adjustment, the carriage 4A, 4B here makes use of an adjusting element in the form of a drive spindle that is also used for the (preferably likewise power-operated) adjustment of a vehicle seat 1A or 1B along the respective seat rail 2A or 2B.

For the adjustment of the carriage 4B by using the drive spindle, the drive motor 42 is coupled with a spindle nut 41 rotatably mounted on the base part 40. This spindle nut 41 meshes with the drive spindle for the vehicle seat 1A or 1B, which in the present case extends over the entire length or at least over a large part of the length of the respective seat rail 2A or 2B. Via its own drive motor 42, a carriage 4A, 4B thus is adjustable along the drive spindle arranged in the seat rail 2A, 2B independently of the vehicle seat 1A or 1B along the respective seat rail 2A or 2B. Of course, however, an adjustment of a carriage 4A, 4B dependent on an adjustment of a vehicle seat 1A, 1B can also be provided alternatively.

For an independent adjustment relative to the respective vehicle seat 1A or 1B an electronic position detection can be provided. Such a position detection can be adapted and provided for avoiding a collision of the carriage 4A or 4B with the vehicle seat 1A or 1B or a connecting component adjustably mounting the vehicle seat 1A or 1B on the seat rail 2A or 2B and protruding from the respective floor slot 20A or 20B on the vehicle floor B during an adjustment along the seat rail 2A or 2B.

A carriage 4A, 4B, which in the design variant of FIGS. 3A and 3B is completely integrated into a respective seat rail 2A, 2B designed as a lower rail, in the present case is adapted and provided for the fixation of a component to the vehicle floor B, which component includes a possibly standardized locking element 5 (i.e. each formed identically for locking with each of the carriages 4A, 4B). FIGS. 3A and 3B by way of example show a locking element in the form of a plug-in tongue 5, which at its front, hook-shaped end 2 includes laterally (and hence radially with respect to an insertion direction E) protruding retaining lugs 54. Via these retaining lugs 54, the plug-in tongue 5 can be positively locked in the base part 40 at a locking opening 400. When the plug-in tongue 5 consequently is properly plugged from above the loading floor B into the locking opening 400 at the base part 40 of a carriage 4A, 4B along an insertion direction E, the plug-in tongue 5 can be blocked against being pulled out of the locking opening 400. In this way, different components can be fixed to the vehicle floor B in a comparatively simple way and in particular without any tools at different adjustment positions by means of a carriage 4A, 4B and can also be exchanged when necessary.

FIG. 3A by way of example shows a component in the form of a load securing belt 6, which is equipped with the plug-in tongue 5 and correspondingly can be positively locked at a carriage 4A, 4B in a simple way in order to be able to secure cargo on a surface of the vehicle floor B behind the vehicle seats 1A, 1B.

While in the design variant of FIGS. 3A and 3B locking of a plug-in tongue 5 can be effected at the base part 40, a possible development of FIGS. 4, 5A-5B and 6A-6B provides a locking possibility for a plug-in tongue 5 via a locking unit 45 additionally fixed to a base part 40. The locking unit 45 provides a locking mechanism 45.1 at a carriage 4A, 4B above the base part 40 (cf. in particular FIGS. 5A-5B and 6A-6B), which can be pre-mounted and pre-checked separately from the base part 40.

In addition to a carrier element in the form of a carrier plate 45T, the locking unit 45 is fixed to the base part 40 on which the drive motor 24 is held. The drive motor 24 thereby is held laterally offset from the seat rails 2A, 2B—analogously to the design variant of FIGS. 3A and 3B—, so that a drive axis of the drive motor 24 extends perpendicularly to the longitudinal axis L. For an electronic control of the operation of the drive motor 42, FIG. 4 by way of example shows an electronic control unit in the form of a controller 43, which is connected to the drive motor 42 via signal lines and possibly power lines. In addition, a link chain 7 extending along a seat rail 2A, 2B also is outlined in FIG. 4. Via such a link chain 7, an adjustment of the carriage 4A, 4B can be controlled likewise with motoric support—in particular as an alternative to the adjustment by means of a drive spindle.

The locking of the plug-in tongue 5 at the carriage 4A, 4B in the present case works purely mechanically, but nevertheless automatically. When the plug-in tongue 5 is plugged to the carriage 4A, 4B from above the vehicle floor B, this leads to the displacement of one of several articulated levers 451, 452, 453 of the locking mechanism 45.1 in the direction of an unlocking position, so that the plug-in tongue 5 with a retaining lug 54 can be guided past a blocking portion in the form of a blocking hook 4520 formed on one of the articulated levers. Due to a pretension applied by tension springs 454A and 454B in the direction of a locking position, the blocking hook 4520 automatically snaps into place at a retaining lug 54 of the plug-in tongue 5 as soon as the plug-in tongue 5 has been plugged in sufficiently far in the direction of the base part 40. The blocking hook 4520 then engages behind the retaining lug 54 of the plug-in tongue 5 and thus prevents that the plug-in tongue 5 can be withdrawn from the carriage 4A, 4B in a direction opposite to the original insertion direction E.

The carriage 4A, 4B of the design variant of FIGS. 4 to 6B furthermore includes a trim element 44 that is accessible on the upper side of the vehicle floor B. A corresponding trim element 44 can also be provided in the design variant of FIGS. 3A and 3B.

In the design variant of FIGS. 4 to 6B, the locking unit 45 is arranged below the trim element 44, but here in turn below the vehicle floor B, so that from the carriage 4A, 4B on the upper side of the vehicle floor B merely the comparatively flat trim element 45 here oval in the top view is visible and accessible. In particular via the trim element 44 a part of an interface visible and accessible on the upper side of the vehicle floor B here consequently is defined for the fixation of a component including the plug-in tongue 5. The trim element 44 therefor includes an oblong slot for introducing a plug-in tongue 5.

Figure 4:
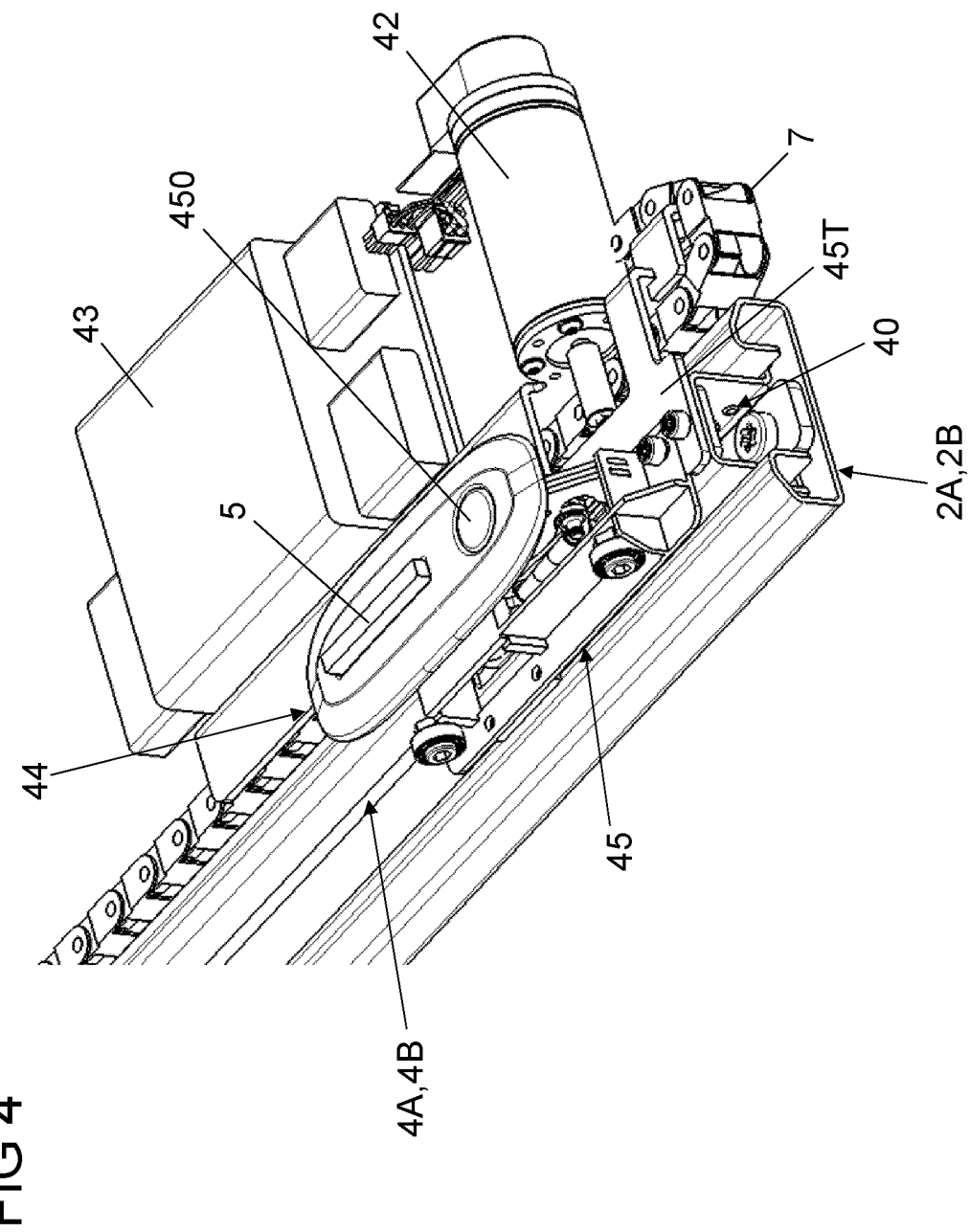
FIG. 4 shows a development of the accessories of FIGS. 1 to 3B with an additional locking unit for locking a locking element at the respective accessory.
Figure 5A:
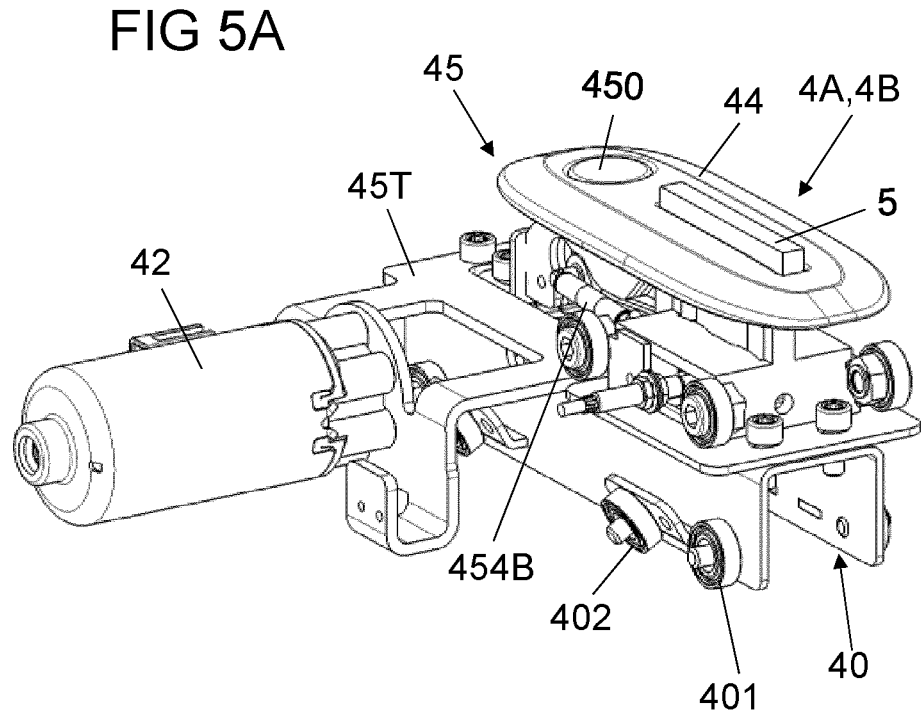
FIGS. 5A-5B show the accessory of FIG. 4 in individual representations without indicating a seat rail.
Figure 5B:
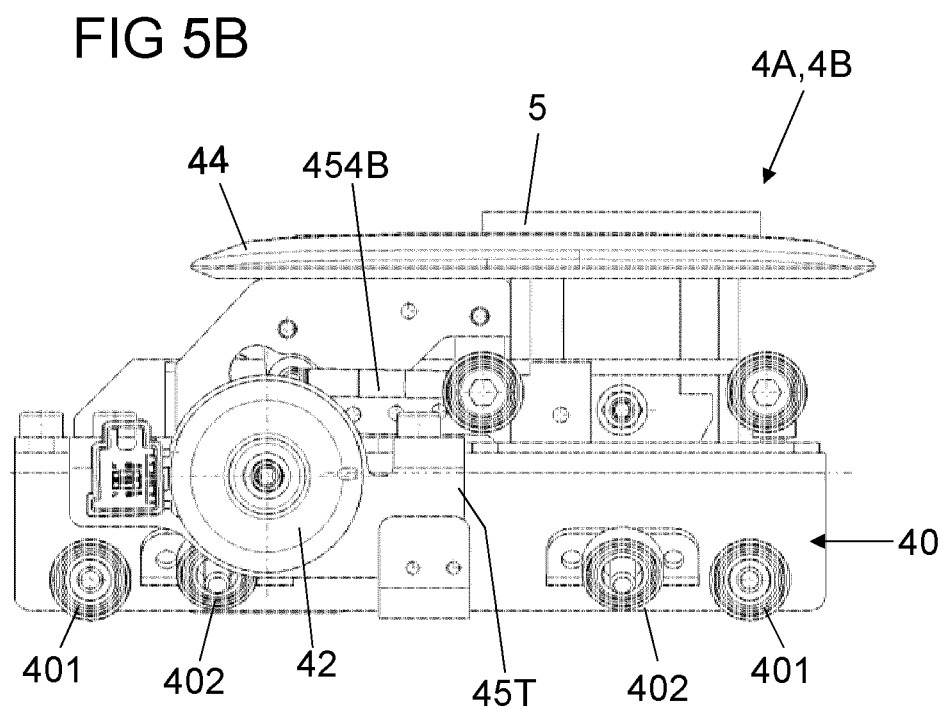

As is shown in particular in the perspective views of FIGS. 4 and 5A and in the side view of FIG. 5B, the trim element 44 additionally includes a cutout for an actuating element in the form of an actuating knob 450. This actuating knob 450 consequently is accessible for a user on the upper side of the trim element 44. The actuating knob 450 here terminates substantially flush with an upper side of the trim element 44.

Figure 6A:
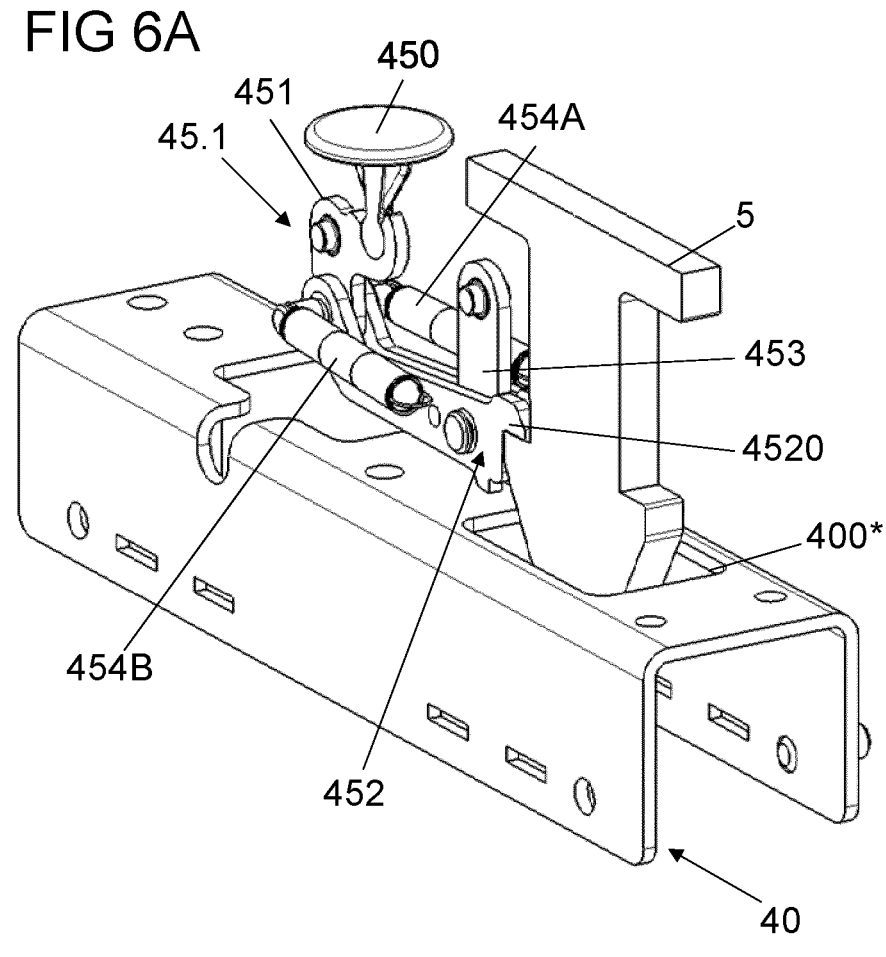
FIGS. 6A-6B in different views show the accessory of FIGS. 4 and 5A to 5B by omitting individual components for the more detailed representation of a locking mechanism of the locking unit.
Figure 6B:
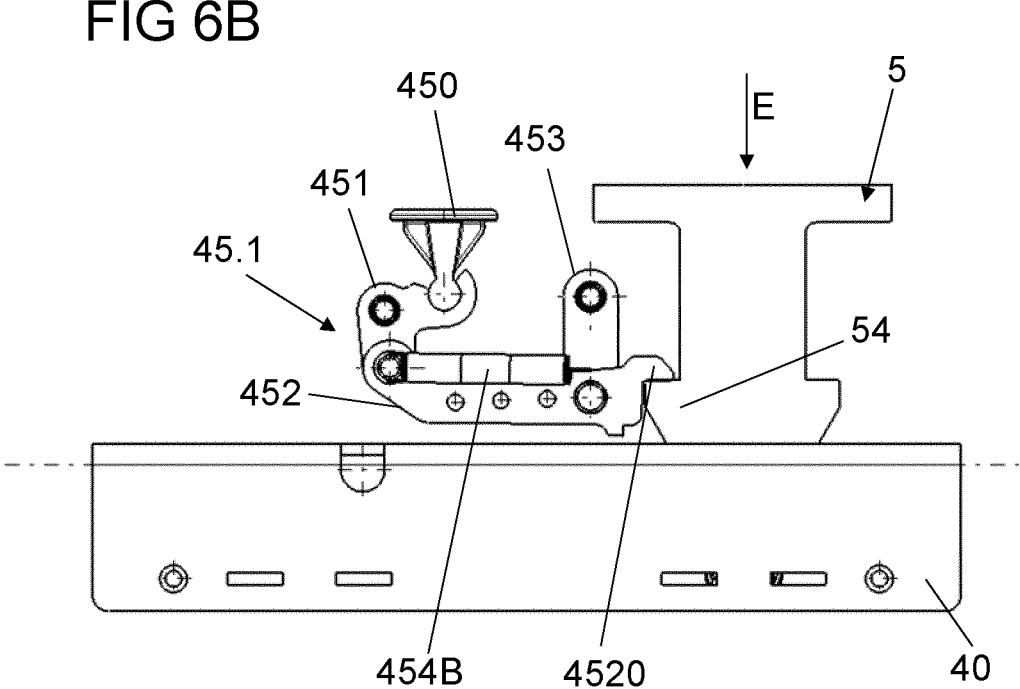

As is illustrated in more detail in particular in the representations of FIGS. 6A and 6B, an actuating force can be introduced into the locking mechanism 45.1 via the actuating knob 450 in order to pivot the articulated lever 452 including the blocking hook 4520 against the restoring forces of the tension springs 454A and 454B from a locking position shown in FIGS. 6A and 6B into an unlocking position. In this unlocking position, the blocking hook 4520 releases the retaining lug 54 of the inserted plug-in tongue 5 and hence permits the extraction of the plug-in tongue 5 against the insertion direction E.

The locking mechanism 45.1 in the present case is formed with a four-bar linkage. The individual articulated levers 451, 452, 453 consequently are articulated to each other and pivotally mounted via four joint axes. The actuating knob 450 is connected to a first pivotally mounted articulated lever 451, which is coupled with the second articulated lever 452 including the blocking hook 4520 via a joint. This second articulated lever 452 in turn is articulated to a likewise pivotally mounted third articulated lever 453.

To consequently again release the plug-in tongue 5, a user merely has to press the actuating knob 450 from above. A (sufficiently high) actuating force applied here onto the actuating knob 450 then is converted into pivotal movements of the articulated levers 451, 452, 453 via the locking mechanism 45.1 so that the blocking hook 4520 is pivoted in the direction of its unlocking position and hence away from a retaining lug 54 of the plug-in tongue 5. In this way, the plug-in tongue 5 can again be withdrawn from the carriage 4A, 4B—as long as a user presses down the actuating knob 450.

In the design variant shown in FIGS. 4 to 6B, the base part 40 has a continuous cutout on its upper side, here in the form of an insertion opening 400*. In contrast to the base-part-side locking opening 400 of the design variant of FIGS. 3A and 3B, locking of the plug-in tongue 5 is not provided at this insertion opening 400*. Rather, the insertion opening 400* in the design variant of FIGS. 4 to 6B in particular serves to provide room for the inserted plug-in tongue 5 so that the same can be plugged in sufficiently far. In this way, the locking unit 45 arranged above the base part 40 can be of comparatively flat design.

As is illustrated in more detail with reference to FIGS. 7A-7B, 8A-8B and 9, a carriage 4A, 4B not only is usable for the defined connection of components behind the vehicle seats 1A and 1B. One or more carriages 4A, 4B and 4C can also be positioned in front of the vehicle seats 1A and 1B with respect to the longitudinal direction L, in order to be able to thereby fix seat comfort components 6.1, 6.2, 6.3 exchangeable in a simple way to the vehicle floor B.

In the design variants of FIGS. 7A-7B, 8A-8B ad 9 an individual carriage 4C therefor is provided on the middle floor slot 20C. Below this floor slot 20C a rail, in particular a seat rail, can likewise be provided for the longitudinal adjustment of this carriage 4C. However, this is not absolutely necessary.

Figures 7A, 7B:
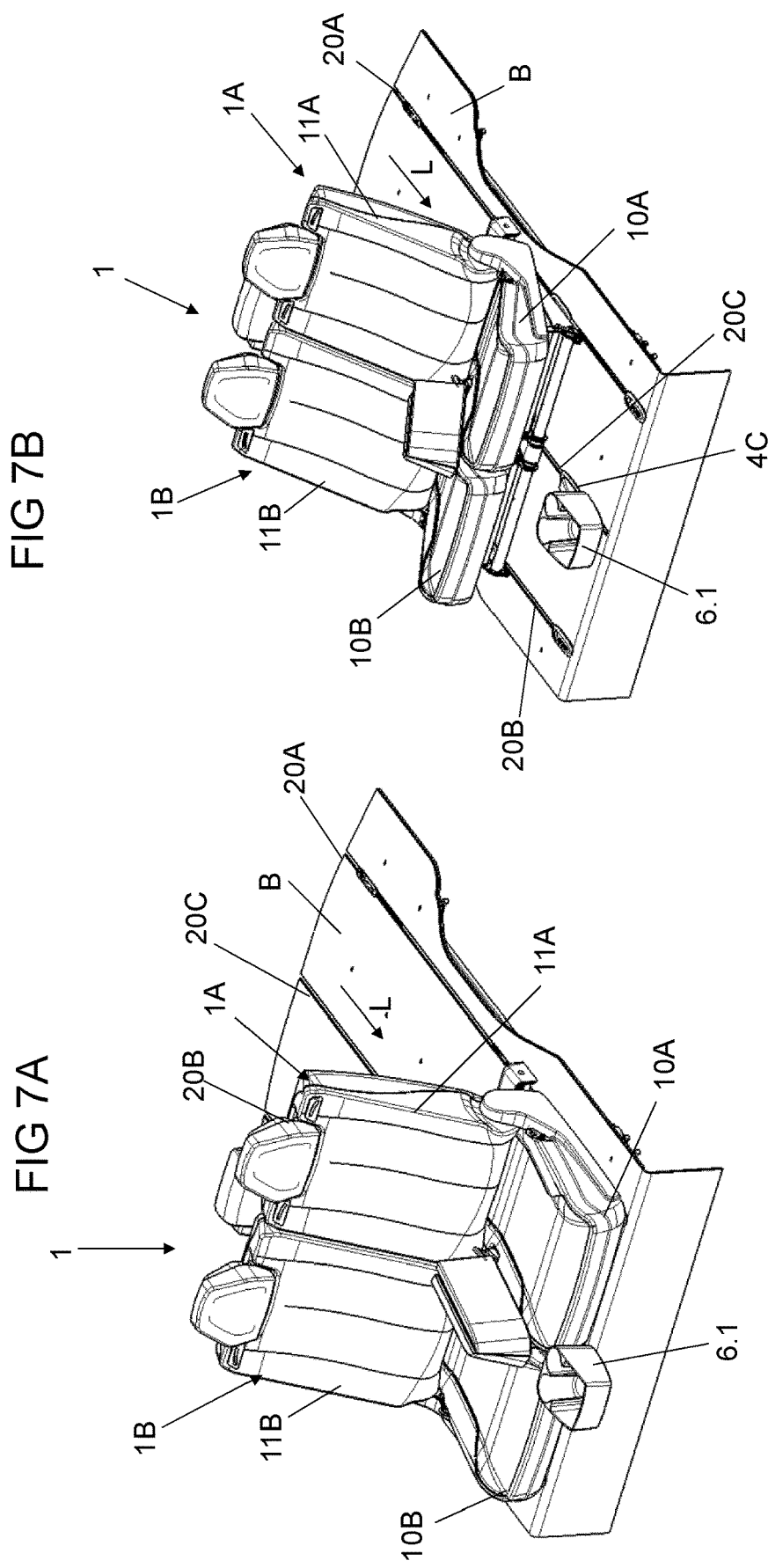
FIGS. 7A-7B in a perspective representation show another design variant of a proposed seat assembly for a design variant of a proposed vehicle, in which in front of the seat assembly a seat comfort component in the form of a storage box is exchangeably fixed via an accessory.

In the design variant of FIGS. 7A-7B, a seat comfort component in the form of a storage box 6.1 with a cup holder is plugged to the middle carriage 4C. Thus, the storage box 6.1 is not fixed to a seat substructure or seating unit of a vehicle seat 1A or 1B, but to the carriage 4C provided on the vehicle floor B, which forms a defined interface for a plug-in tongue 5 that is provided on the storage box 6.1.

Figure 8B:
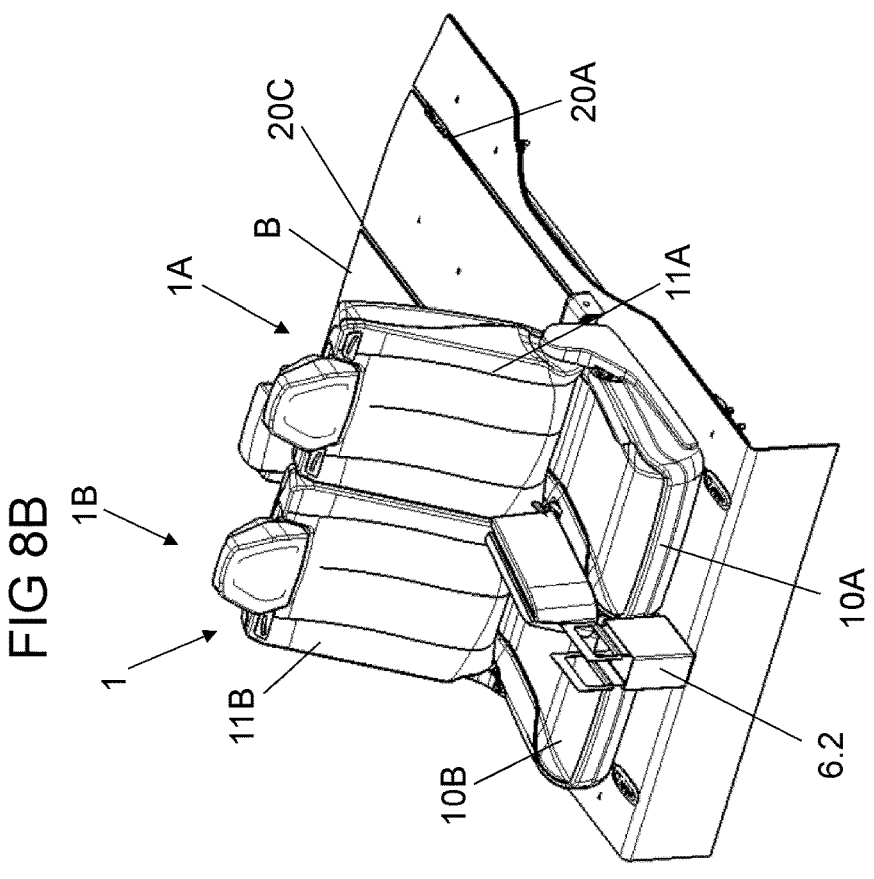
FIGS. 8A-8B in views corresponding with FIGS. 7A and 7B show the seat assembly with another seat comfort component in the form of a pocket element plugged to the accessory.
Figure 8A:
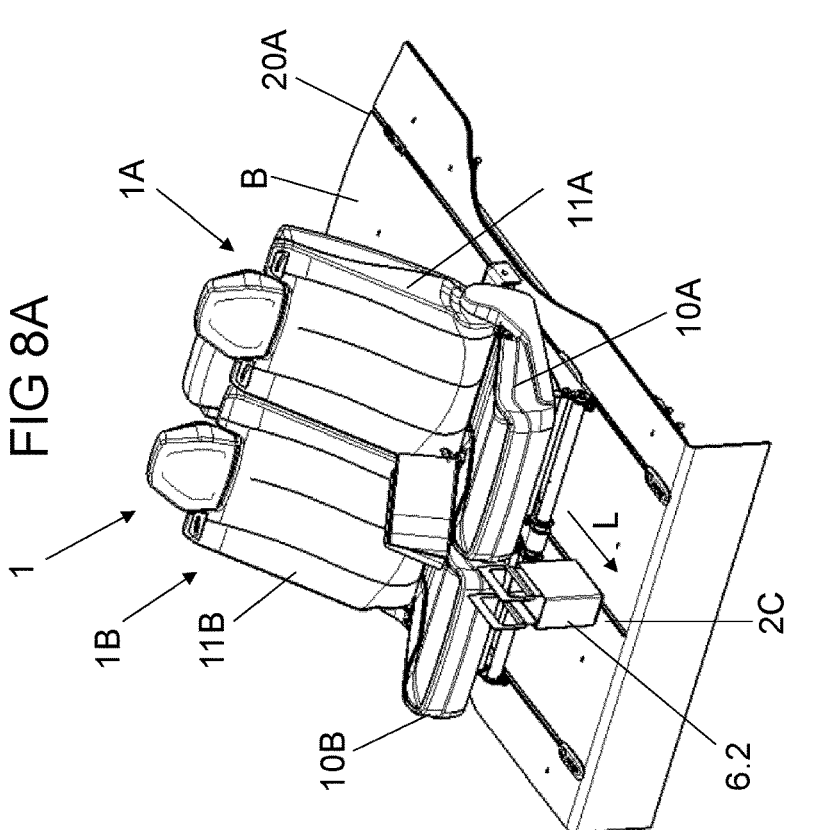

Corresponding to the representation of FIGS. 8A and 8B, the storage box 6.1 can be exchanged against another seat comfort component in the form of a pocket element 6.2 without any tools. Corresponding to the variants explained above, locking with a corresponding plug-in tongue 5 for example can be released in order to subsequently plug the pocket element 6.2 with an identically formed plug-in tongue 5 to the carriage 4C.

Figure 9:
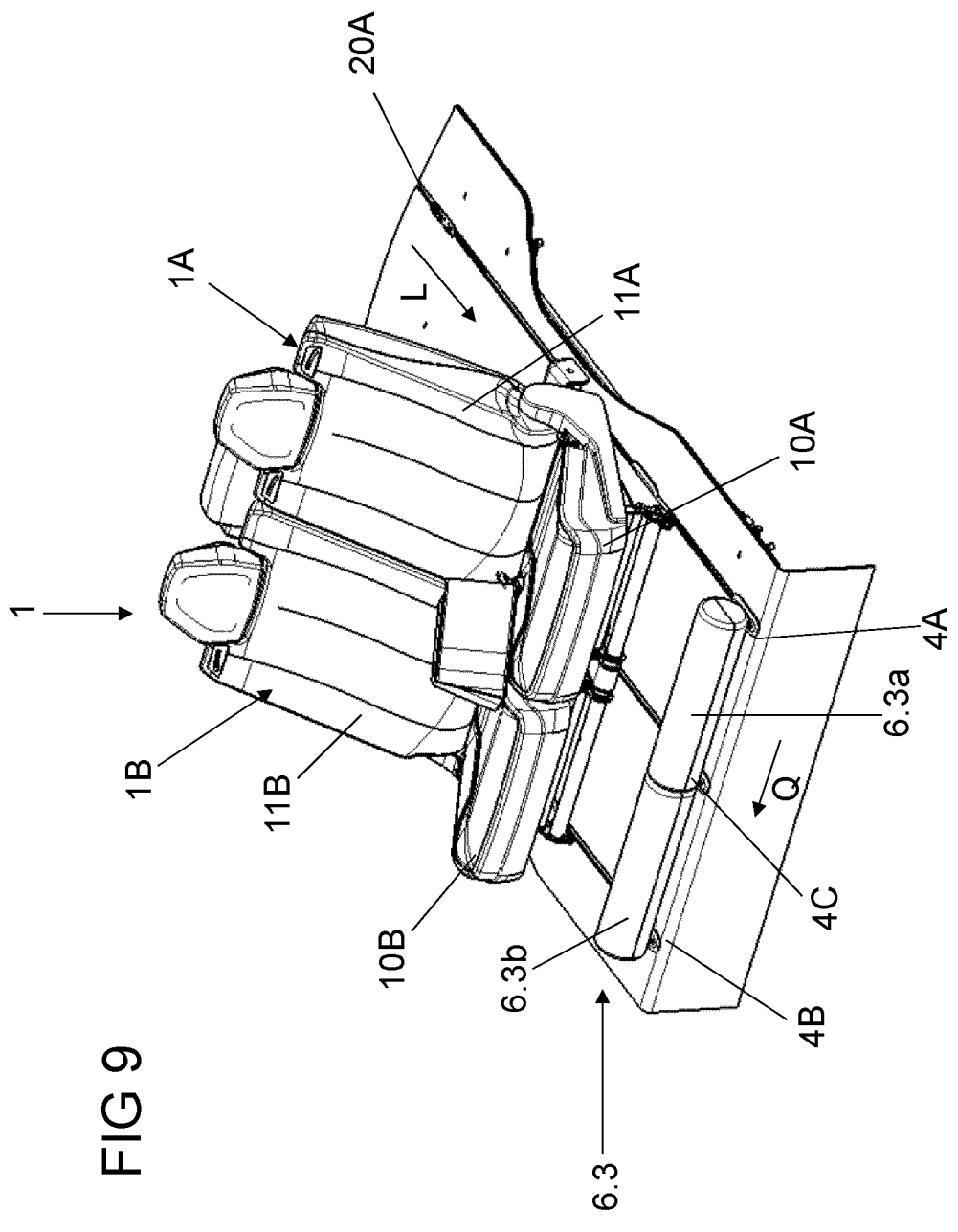
FIG. 9 in views corresponding with FIGS. 7A to 8B show the seat assembly with an alternative seat comfort component in the form of a footrest fixed to a plurality of accessories.

In the design variant of FIG. 9, carriages 4A, 4B on the outer seat rails 2A and 2B also are used in addition to the middle carriage 4C, in order to fix another seat comfort component, here in the form of a footrest 6.1 usable for both vehicle seats 1A, 1B, to the vehicle floor B. Thus, the footrest 6.3 for example includes three plug-in tongues 5 which are plugged to the carriages 4A, 4B and 4C positioned one beside the other along a transverse direction Q extending perpendicularly to the longitudinal direction L.

The footrest 6.3 fixed in this way to the vehicle floor B comprises two support portions 6.3a and 6.3b which then are arranged in front of the two vehicle seats 1A and 1B so that persons sitting on the vehicle seats 1A, 1B can comfortably support their feet on an associated support portion 6.3a, 6.3b. When carriages 4A, 4B, 4C are longitudinally shiftably mounted along the respective floor slots 20A, 20B and 20C as explained above, the footrest 6.3 (like also a storage box 6.1 and/or a pocket element 6.2) can be longitudinally adjusted relative to the vehicle seats 1A, 1B, but jointly with the vehicle seats 1A, 1B. In particular, a power-operated adjustment of the carriages 4A, 4B, 4C can be made possible via their drive motors 42.

As illustrated in the design variants of FIGS. 7A to 9, a vehicle interior I thus can be individualized in a particularly simple way with the proposed solution. In the seat assembly 1, the one seat comfort component 6.1, 6.2, 6.3 thus can be exchanged against the other one without any tools depending on the requirement, in particular as desired by a user. The (coupling) interface provided by a carriage 4A, 4B, 4C then allows simple plugging and locking of the respective seat comfort component 6.1, 6.2, 6.3 via one or more inserted plug-in tongues 5.

In particular, by mounting a carriage 4A, 4B, 4C on one of the seat rails 2A, 2B it furthermore is ensured that forces occurring in operation and also in the case of a crash are reliably introduced into a bodywork component. Via the base part 40 shiftably guided on and in each of the seat rails 2A, 2B, analogously to the combination of upper rail and lower rail known from the seating area, forces can be introduced into the respective seat rail 2A, 2B and hence into a body-mounted vehicle floor assembly. Moreover, it is not absolutely necessary either in this respect that a carriage 4A, 4B, 4C likewise (like an associated vehicle seat 1A or 1B) is adjustable on a seat rail 2A, 2B in a power-operated way. In design variants of the proposed solution, a purely manual adjustment of one or several carriages 4A, 4B or 4C (mounted in particular on a single seat rail 2A or 2B) can be provided.

LIST OF REFERENCE NUMERALS 1 seat assembly
10A, 10B seat part
11A, 11B backrest
1A, 1B vehicle seat
2 rail arrangement
20A, 20B, 20C floor slot
2A, 2B seat rail
3A, 3B cover
40 base part
400 locking slot
400* insertion opening
401,402 guide roller
41 spindle nut (drive element)
42 drive motor
43 controller (control unit)
44 trim element
45 locking unit
45.1 locking mechanism
450 actuating knob (actuating element)
451, 452, 453 articulated lever
4520 blocking hook (blocking portion)
454A, 454B tension spring (spring element)
45T carrier plate (carrier component)
4A, 4B, 4C cargo/component carriage (accessory)
5 plug-in tongue (locking element)
54 retaining lug
6 load securing belt
6.1 storage box (seat comfort component)
6.2 pocket element (seat comfort component)
6.3 footrest
6.3a, 6.3b support portion
7 link chain
B vehicle floor
E insertion direction
I vehicle interior
L (seat) longitudinal direction
Q transverse direction
V1, V2 adjustment direction

The invention claimed is:

1. A seat assembly for a vehicle, comprising at least one vehicle seat and at least one seat rail via which the at least one vehicle seat is adjustably mounted, wherein
   on the seat rail in addition at least one accessory is adjustably mounted, which provides an interface for the connection with a component independently of the vehicle seat.

2. The seat assembly according to claim 1, wherein the at least one accessory on the seat rail is at least one of independent of the vehicle seat and provided jointly with the vehicle seat.

3. The seat assembly according to claim 1, wherein for the adjustment of the vehicle seat an adjusting element is provided on the seat rail, via which an adjusting force can be generated for adjusting the vehicle seat along the seat rail, and the accessory is adapted to likewise cooperate with the adjusting element for an adjustment of the accessory along the seat rail.

4. The seat assembly according to claim 3, wherein the adjusting element comprises a drive spindle or a toothed rack.

5. The seat assembly according to claim 1, wherein at least one of
   the accessory is adjustable along the seat rail, with respect to a longitudinal direction, into an adjustment position before or behind the vehicle seat,
   the accessory is adjustable along the seat rail into an adjustment position in which the accessory above the seat rail is covered by at least one of a seat substructure of the vehicle seat and a cover provided behind the vehicle seat, with respect to a longitudinal direction, and
   the accessory is adjustable along the seat rail in a power-operated way.

6. The seat assembly according to claim 1, wherein the seat rail is provided for an assembly below a vehicle floor on the side of the interior space and the accessory comprises at least one trim element that defines at least part of the interface and is accessible when the seat assembly is properly mounted in a vehicle on the vehicle floor.

7. The seat assembly according to claim 6, wherein at the interface of the accessory a locking is provided for a locking element of the component to be connected to the accessory, which is plugged to the accessory, wherein on the trim element an actuating element is provided in order to release the lock with the locking element.

8. The seat assembly according to claim 7, wherein the accessory includes a locking mechanism with at least one adjustable blocking portion for locking a component-side locking element, wherein the blocking portion adjusted into a locking position blocks the locking element against removal from the accessory, wherein by actuating the actuating element the blocking portion can be adjusted from its locking position into an unlocking position in which a lock with a component-side locking element is released.

9. The seat assembly according to claim 1, wherein at the interface of the accessory a locking is provided for a locking element of the component to be connected to the accessory, which is plugged to the accessory.

10. The seat assembly according to claim 9, wherein the accessory includes a locking mechanism with a plurality of pivotally mounted articulated levers for locking a component-side locking element.

11. The seat assembly according to claim 9, wherein the accessory includes a locking mechanism with at least one adjustable blocking portion for locking a component-side locking element, wherein the blocking portion adjusted into a locking position blocks the locking element against removal from the accessory.

12. The seat assembly according to claim 1, wherein at least one of the accessory is shiftably mounted on the seat rail via a slideway or a roller guide, the accessory is shiftably mounted on the seat rail via a slideway or a roller guide, the accessory is adapted and provided for connection with at least one of a load securing belt and a load securing strap, and the accessory is adapted and provided for connection with a seat comfort component that is adapted and provided for use by a person sitting on the vehicle seat.

13. The seat assembly according to claim 1, wherein the seat assembly comprises at least two vehicle seats and at least two seat rails on each of which an accessory is adjustably mounted.

14. A vehicle, comprising at least one vehicle seat arranged on a vehicle floor and at least one seat comfort component that is adapted and provided for use by a person sitting on the vehicle seat, wherein the seat comfort component is fixed via an interface provided by an accessory on the vehicle floor and can be exchanged against another seat comfort component.

15. The vehicle according to claim 14, wherein different seat comfort components are provided, which can be fixed to the vehicle floor and be exchanged against each other via an interface provided by the accessory.

16. The vehicle according to claim 14, wherein the seat comfort components can be exchanged against each other by a user of the vehicle without any tools.

17. The vehicle according to claim 14, wherein via the interface a plug connection is defined for seat comfort components so that a seat comfort component can be plugged to the accessory.

18. The vehicle according to claim 14, wherein at least one of the accessory is adjustable relative to the vehicle seat (1A, 1B), the accessory is adjustable relative to the vehicle seat, the accessory is arranged before or behind the vehicle seat with respect to a longitudinal seat direction, and the one accessory is a first accessory and at least one further, second accessory is provided, which is arranged relative to the first accessory in such a way that after removal of the one seat comfort component from the one accessory the other seat comfort component can be fixed to the vehicle floor by connection both with the first accessory and with the second accessory.

19. A method for mounting a seat assembly in a vehicle, including a vehicle floor on which at least one vehicle seat of the seat assembly is arranged, the method comprising at least the following steps:

providing an interface for seat comfort components on the vehicle floor by at least one accessory, providing at least two different seat comfort components for the seat assembly, which each are adapted and provided for use by a person sitting on the vehicle seat and each include a locking element for locking the respective seat comfort component at the interface, selecting a seat comfort component from the at least two different seat comfort components, and connecting the selected seat comfort component to the accessory.

20. The method according to claim 19, wherein at least one of the accessory is adjustably mounted on a seat rail on which the at least one vehicle seat also is adjustably mounted, and the selected seat comfort component is plugged and locked to the accessory without any tools.

* * * * *